United States Patent Office 3,766,060
Patented Oct. 16, 1973

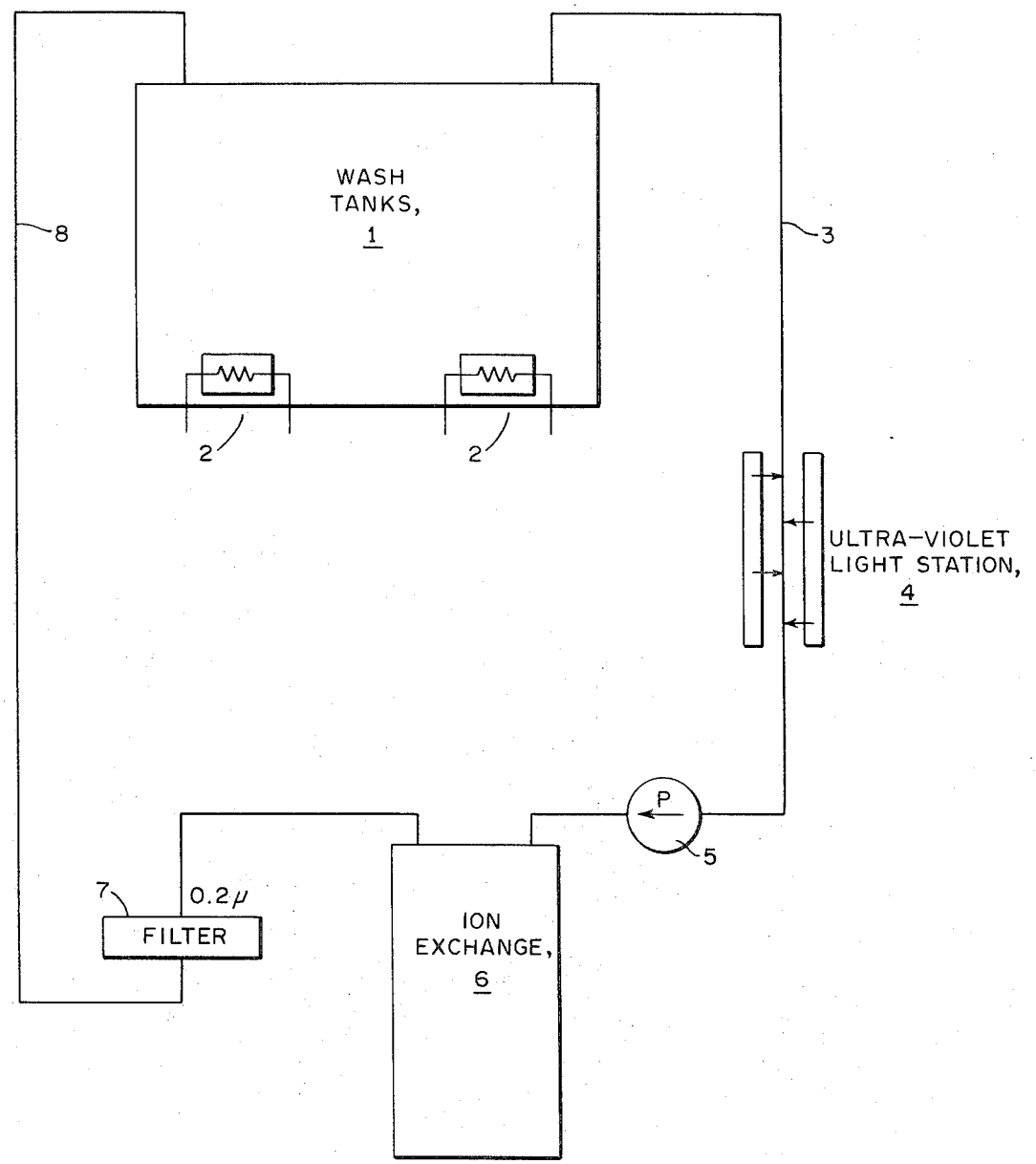

3,766,060
RINSE WATER PURIFICATION
Verity C. Smith, Dedham, Mass., assignor to Vaponics Incorporated, Plymouth, Mass.
Continuation of application Ser. No. 57,434, July 23, 1970. This application July 12, 1972, Ser. No. 270,994
Int. Cl. C02b 3/04
U.S. Cl. 210—64                           5 Claims

ABSTRACT OF THE DISCLOSURE

The use of a 0.2-micron filter is made possible in a recirculating wash or rinse system by maintaining the system under biologically sterile conditions. Sterile conditions are best maintained by either exposing the liquid to ultraviolet light or by keeping the system at a constant high temperature.

---

This is a continuation of application Ser. No. 57,434, filed July 23, 1970, now abandoned.

This invention relates to the method of purification of liquid in a recirculating rinse or wash system where liquid of extremely high purity is required. More specifically it relates to the use of a filter or filters having a mean pore size of about 0.2 micron or less, and the operating conditions necessary in order that use of the filter is practical.

A serious problem especially in the micro-electronic industry, is biological contamination and small particle contamination in wash or rinse systems. Conventional systems have purification loops or systems operating at relatively low temperatures and flow rates, and employing filters in the 0.45 to 0.50 micron range. These systems have been found to be relatively ineffective in biological contamination removal and small particle removal. Attempts have been made to solve this problem by use of smaller pore size filters. These filters, especially filters of about 0.2 micron, have small enough pores to insure adequate removal of these serious contaminants, but because the overall system is operated at conditions which do not reduce or retard bacterial growth, these filters tend to plug rapidly, and frequent shutdowns for filter changes are required.

It is the object of this invention to provide a method wherein filters having a mean pore size of about 0.2 micron or less can be used and, therefore, liquid free from biological contaminants and of extreme purity can be produced for the wash or rinse operation. This is accomplished by operating the system under conditions that retard bacterial growth to the extent that frequent filter change due to plugging ceases to be a problem.

Specifically the system of this invention employs a 0.2-micron filter in a recirculating wash or rinse system operating under sterile conditions by either exposing the liquid to ultraviolet (U.V.) radiation at room temperature (70° F.) or above or by heating the liquid to and maintaining it at a temperature above 120° F.

Additionally the system is operated at a relatively high flow rate sufficient to insure that the liquid will move through the system faster than bacteria can grow, that is, any bacteria in the system will be brought into contact with the ultraviolet light or the 0.2-micron filter often enough so that they will be either killed by the ultraviolet light or filtered out before they have a chance to grow.

A preferred embodiment of this invention is shown in the accompanying schematic diagram. The wash tank 1 contains heating means 2 necessary to maintain the water therein at the desired constant temperature of 120° F. or above. The spent wash or rinse water exits from the tanks 1 through pipe 3 and passes to the ultraviolet light station 4 where the stream is exposed to a sufficient amount of ultraviolet light to kill the bacteria in the water. The stream then flows to a pump 5 designed to maintain the necessary high flow rate. From the pump 5 the stream flows into the ion-exchange resin beds 6, then into the 0.2-micron filter 7 and finally purified water exiting from the filter flows to the wash or rinse tanks through pipe 8.

The ultraviolet light station 4 can be, for example, an open tank into which the liquid flows with an ultraviolet light source mounted above it, or a bank of quartz tubes through which the liquid flows and an ultraviolet light source mounted so that the liquid is exposed to it.

Although the invention has been described with reference to its preferred embodiment it is contemplated that obvious modifications will occur to those skilled in the art and familiar with this disclosure and that such may be made without departing from the scope of this invention. Having thus disclosed my invention, I claim and desired to secure by Letters Patent:

1. In a method for purifying liquid in a recirculating wash or rinse system in which the liquid to be purified is passed through a purification loop which includes a filter wherein the improvement comprises subjecting the liquid to be purified to a sterilization means prior to being passed through the purification loop and circulating the liquid at a rate sufficient to maintain said liquid under biologically sterile conditions as said liquid circulates between said sterilization means and the filter and thereby enable the efficient use of a filter having a mean pore size of 0.2 micron or less in said purification loop.

2. The method as set forth in claim 1 wherein the liquid is subjected to sterilization means by exposing the liquid to ultraviolet light of sufficient intensity to eliminate biological contamination.

3. The method as set forth in claim 1 wherein the liquid is subjected to sterilization means by maintaining the system at a constant temperature greater than about 120° F.

4. The method as set forth in claim 1 wherein the liquid to be purified is water.

5. The method as set forth in claim 1 wherein the liquid to be purified is distilled water.

References Cited
UNITED STATES PATENTS

| | | | |
|---|---|---|---|
| 2,889,275 | 6/1959 | Moore | 210—18 |
| 3,414,394 | 12/1968 | Poad | 210—496 |
| 2,682,006 | 6/1954 | Ferrari, Jr. | 210—167 |
| 3,192,145 | 6/1966 | Vellas et al. | 210—169 X |

OTHER REFERENCES

Publication: Millipore Filter Corporation, Watertown, Mass., 1955, pp. 7–8.

SAMIH N. ZAHARNA, Primary Examiner
R. H. SPITZER, Assistant Examiner

U.S. Cl. X.R.
210—70